United States Patent
Milgram (10) Patent No.: US 7,167,562 B2
(45) Date of Patent: Jan. 23, 2007

(54) SECURITY METHOD USING INFORMATION TRANSMISSION BY OPTICAL MEANS, AND AN OPTICAL DISK FOR IMPLEMENTING THE METHOD

(75) Inventor: Maurice Milgram, Paris (FR)

(73) Assignee: DHVA, Inc., Milpitas, CA (US)

( * ) Notice: Subject to any disclaimer, the term of this patent is extended or adjusted under 35 U.S.C. 154(b) by 901 days.

(21) Appl. No.: 09/900,716

(22) Filed: Jul. 6, 2001

(65) Prior Publication Data

US 2002/0031227 A1  Mar. 14, 2002

(30) Foreign Application Priority Data

Jul. 7, 2000  (FR) .................................. 00 08898
May 10, 2001  (FR) .................................. 01 06177

(51) Int. Cl.
- *H04K 1/00* (2006.01)
- *H04N 7/167* (2006.01)
- *H04L 9/00* (2006.01)
- *G06K 9/00* (2006.01)
- *G10L 15/00* (2006.01)
- *G05B 19/00* (2006.01)

(52) U.S. Cl. ....................... 380/256; 380/201; 380/227; 713/165; 713/183; 713/184; 713/194; 726/26; 705/55; 382/115; 382/116

(58) Field of Classification Search ................ 380/256; 713/183, 184, 200

See application file for complete search history.

(56) References Cited

U.S. PATENT DOCUMENTS

| | | | |
|---|---|---|---|
| 4,599,489 A | 7/1986 | Cargile | 705/52 |
| 4,609,777 A | 9/1986 | Cargile | 713/84 |
| 4,819,267 A | 4/1989 | Cargile et al. | 713/184 |
| 4,910,775 A | 3/1990 | Yves et al. | 713/184 |
| D313,229 S | 12/1990 | Audebert et al. | 380/251 |
| D313,410 S | 1/1991 | Audebert et al. | 380/251 |
| 5,065,429 A * | 11/1991 | Lang | 705/56 |
| 5,073,931 A | 12/1991 | Audebert et al. | 380/251 |
| 5,136,644 A | 8/1992 | Audebert et al. | 380/251 |
| 5,191,644 A * | 3/1993 | Takeda | 715/790 |

(Continued)

FOREIGN PATENT DOCUMENTS

EP    0 172 239 B1    5/1989

(Continued)

OTHER PUBLICATIONS

McMillin et al, Personal Computing for the Visually Impaired, 1989, IEEE, pp. 17-20.*

(Continued)

*Primary Examiner*—Christopher Revak
*Assistant Examiner*—Aravind K Moorthy
(74) *Attorney, Agent, or Firm*—Donald R. Boys; Central Coast Patent Agency, Inc (57) ABSTRACT

An electronic security device has a light-receiving interface that receives a modulated light signal emitted by the screen of a computer making use of the data medium, an output interface adapted to emit output information as a function of the received input information, and an electronic central unit connected to the receive and emit interfaces and adapted to determine the output information as a function of the input information and to cause said output information to be emitted.

14 Claims, 3 Drawing Sheets

U.S. PATENT DOCUMENTS

| | | | |
|---|---|---|---|
| 5,297,205 A | 3/1994 | Audebert et al. | 380/251 |
| 5,347,110 A | 9/1994 | Audebert et al. | 235/380 |
| 5,432,851 A | 7/1995 | Scheidt et al. | 713/184 |
| 5,594,493 A | 1/1997 | Nemirofsky | 725/23 |
| 5,652,838 A | 7/1997 | Lovett et al. | 713/200 |
| 5,668,945 A * | 9/1997 | Ohba et al. | 726/30 |
| 5,767,896 A | 6/1998 | Nemirofsky | 725/23 |
| 5,880,769 A | 3/1999 | Nemirofsky et al. | 725/139 |
| 5,907,350 A | 5/1999 | Nemirofsky | 725/23 |
| 6,005,940 A * | 12/1999 | Kulinets | 705/51 |
| 6,044,046 A | 3/2000 | Diezmann et al. | 369/14 |
| 6,149,064 A * | 11/2000 | Yamaoka et al. | 235/479 |
| 6,281,820 B1 | 8/2001 | Fields | 341/137 |
| 6,282,553 B1 * | 8/2001 | Flickner et al. | 708/141 |
| 6,453,369 B1 * | 9/2002 | Imamura et al. | 710/36 |
| 6,577,329 B1 * | 6/2003 | Flickner et al. | 715/774 |
| 6,704,715 B1 * | 3/2004 | Rosset et al. | 705/72 |
| 6,751,734 B1 * | 6/2004 | Uchida | 713/186 |
| 2003/0023881 A1* | 1/2003 | Fitzgibbon et al. | 713/202 |
| 2004/0143766 A1* | 7/2004 | Fitzgibbon et al. | 713/202 |
| 2004/0249641 A1* | 12/2004 | Kwak | 704/275 |

FOREIGN PATENT DOCUMENTS

| | | |
|---|---|---|
| EP | 0 236 412 B1 | 4/1992 |
| EP | 0 267 085 B1 | 4/1992 |
| EP | 0 338 936 B1 | 12/1993 |
| EP | 0 399 897 B1 | 3/1994 |
| EP | 0 425 347 B1 | 3/1995 |
| EP | 0 591 138 B1 | 1/1997 |
| EP | 0 552 822 B1 | 5/1999 |
| FR | 2753857 | 3/1998 |
| WO | WO 97/41562 | 11/1997 |

OTHER PUBLICATIONS

Liu et al, Improving Web Access for the Visually Impaired Users, 2004, IEEE, pp. 28-33.*

Kesmodel, David, Gadgets: Internet Codes Stump Surfers; Security Tools Meant to Thwart Spammers Trip Legitamate Users, 2006, The Wall Street Journal Asia, p. 30.*

Official Search Report for parent French Application No. 0008898 filed on Jul. 7, 2000; report dated May 16, 2001.

International Search Report for parent PCT Application No. PCT/FR01/02162, report dated Aug. 31, 2001.

* cited by examiner

SECURITY METHOD USING INFORMATION TRANSMISSION BY OPTICAL MEANS, AND AN OPTICAL DISK FOR IMPLEMENTING THE METHOD

FIELD OF THE INVENTION

The present invention relates to security methods using information transmission by optical means, and to optical disks for implementing the methods.

More particularly, the invention relates to a security method using information transmission by light means between a user electronic apparatus (in particular: a microcomputer, a payment terminal, a real or electronic cash dispenser, an access control terminal, etc., or any other apparatus that uses an electronic security device) having at least one input interface and a screen, and an electronic security device which comprises:

- a receive interface having at least one light sensor for receiving input information coming from the user electronic apparatus;
- an emit interface adapted to emit output information as a function at least of received input information, the output information corresponding (directly or indirectly) to a security code for communicating to the input interface of the user electronic apparatus; and
- an electronic central unit connected to the receive and emit interfaces and adapted to determine the output information as a function at least of the input information, and to cause said output information to be emitted by the emit interface;

the security method comprising the following steps:

a) causing the input information to be transmitted by the user electronic apparatus to the receive interface of the electronic security device;

b) causing the output information to be determined by the central unit of the electronic security device, as a function of the input information;

c) causing the emit interface of the electronic security device to emit the output information corresponding to said security code, and communicating said security code to the user electronic apparatus, via the input interface of said user electronic apparatus; and d) verifying that the security code received by the user electronic apparatus is related to the input information by a predetermined relationship, in particular to authorize or not authorize certain operations performed by means of said user electronic apparatus (the operations in question can be performed directly by the user electronic apparatus, or where appropriate by a remote electronic apparatus connected to said user apparatus).

BACKGROUND OF THE INVENTION

Document U.S. Pat. No. 5,652,838 describes an example of a method using such an electronic security device, specifically integrated in an optical disk. The input interface is constituted by light sensors adapted to detect the read laser beam of a computer using the optical disk, which laser beam is controlled so that the sequence with which it strikes the light sensors corresponds to an input code. The output interface of the optical disk is constituted by a screen which displays an output code as a function of the input code it receives from the computer. The user needs to take the optical disk out from the reader in order to read the output code, after which the user types this code on the keyboard of the computer, thereby authorizing use of the optical disk by the computer. This provides protection against illicit copies of the optical disk.

Those arrangements appear most attractive since they enable information to be sent to the optical disks using the read beam that is already available for reading the disk.

Unfortunately, those arrangements present the drawback of requiring light sensors to be placed in the data area of the disk in order to enable the sensors to receive the read beam, thus giving rise to constraints as to how data is positioned in said data storage area and putting limits on the capacity of said data area.

Furthermore, that solution is usable only with an optical disk and not with an electronic security device integrated in some other data medium or constituting a self-contained appliance independent of a data medium.

SUMMARY OF THE INVENTION

A particular object of the present invention is to mitigate those drawbacks.

To this end, in the invention, a security method of the kind in question is characterized in that during step a), the light sensor of the electronic security device is placed facing the screen of the user electronic apparatus while said screen is caused to emit a modulated light signal carrying the input information.

When the electronic security device is integrated in an optical disk, this avoids the above-mentioned constraints relating to the capacity of the data area and to the positioning of the data in said data area, since in the present case it is no longer necessary to place the light sensor in the data area when the data medium is an optical disk.

In addition, this technical solution can be used not only with data media suitable for being read optically, but also with other types of data media, in particular those suitable for being read magnetically, and also with other devices such as badges, etc.

In preferred implementations of the invention, use may optionally be made of one or more of the following dispositions:

- during step d), certain operations performed by means of the user electronic apparatus are authorized or not authorized as a function of verifying the security code;
- the electronic security device belongs to a medium carrying digital data and readable by the user electronic apparatus;
- the data medium used is an optical disk having an annular data area surrounding a central portion carrying no digital data, which central portion includes the light sensor;
- during step a), said modulated light signal is emitted in a predetermined area belonging to the screen, and the light sensor of the data medium is placed in the immediate vicinity of said predetermined area;
- during step a), said predetermined area of the screen is indicated by at least one mark displayed by the screen;
- during step c), the output information is emitted by the electronic security device in the form of a sound signal;
- the sound signal containing the output information is listened to by a human operator, which operator determines the security code as a function of the listened-to signal (where appropriate, said security code can be constituted by the output information itself), and communicates this security code to the user electronic apparatus via its input interface;

the sound signal containing the output information is received directly by the input interface of the user electronic apparatus;

the sound signal containing the output information is transmitted to a remote monitoring station which determines the security code as a function of said sound signal and transmits said security code to the input interface of the user electronic apparatus;

during step c), the output information is emitted by the electronic security device by being displayed on a display device;

encoded data is caused to be interchanged between a remote central station communicating with the user electronic apparatus and the central unit of the electronic security device via the emit and receive interfaces of said electronic security device (this makes it possible in particular to identify the user as a function of encoded data interchanged between the remote central station and the central unit of the electronic security device for the purpose of making a remote operation secure, e.g. a remote payment operation, etc.);

the electronic security device stores a count of units of value, and the central unit of said electronic security device is adapted to cause said count of units of value to vary as a function of encoded data received and emitted by the central unit via the received and emit interface;

the electronic security device belongs to a portable digital data medium which can be read by the user electronic apparatus while said data medium is set in motion, the electronic security device storing at least one count of utilization units, and the central unit of said security device causing said count to vary as a function of the movements of the data medium as detected by a motion sensor;

the utilization unit count is read by an external reader using a communication interface belonging to said security device;

the method includes a step of activating at least certain functions of the electronic security device, during which step a predetermined access code is communicated to the central unit of said electronic security device;

during the activation step, the access code is communicated to the central unit by means of a user-actuatable input interface of the electronic security device;

during the activation step, the access code is communicated to the central unit by positioning the light sensor of the electronic security device successively in register with a plurality of predetermined areas belonging to the screen of the user electronic apparatus, the various predetermined areas of the screen emitting respective different predetermined optical signals, each corresponding to a symbol displayed on the screen;

in order to communicate the access code to the central unit of the electronic security device, the access code is initially communicated to the user electronic apparatus using the input interface of the user electronic apparatus, the light sensor of the electronic security device is placed facing the screen of the user electronic apparatus, and said screen is caused to emit a modulated light signal corresponding to said access code;

during step b), the central unit of the electronic security device is caused to determine the output information as a function of the input information and a personal code previously communicated to said central unit by the user of the electronic security device;

during step b), the personal code is communicated to the central unit of the electronic security device by means of a user-actuatable input interface of the electronic security device;

during step b), the personal code is communicated to the electronic central unit by positioning the light sensor of the electronic security device successively in register with a plurality of predetermined areas belonging to the screen of the user electronic apparatus, these various predetermined areas of the screen emitting respective different predetermined light signals and each corresponding to a symbol displayed on the screen;

during step b), in order to communicate the personal code to the central unit of the electronic security device, the personal code is initially communicated to the user electronic apparatus by using the input interface of said user electronic apparatus, the light sensor of the electronic security device is placed facing the screen of the electronic user apparatus, and said screen is caused to emit a modulated light signal corresponding to said personal code;

during step d), a monetary operation is authorized or not authorized;

the electronic security device stores at least one count of units of value, and during step d) an operation implying a change to said count of units of value is authorized or not authorized;

during step d), units are exchanged between the count of units of value in the electronic security device and a remote count of units managed by a remote apparatus connected by telecommunications means to the user electronic apparatus;

during step d), after a count of units of value in the electronic security device has been modified, the output interface is caused to emit acknowledgment information, and the acknowledgment information is communicated to the user electronic apparatus via the input interface of said user electronic apparatus;

during step a):
the user is caused to select a screen area on the screen of the user electronic apparatus, and associated with predetermined visual signaling amongst a plurality of screen areas associated with different visual signaling, said screen areas emitting respective different modulated light signals carrying different input information; and
the light sensor of the electronic security device is placed facing the screen area selected by the user and the modulated light signal emitted by said screen area is picked up by means of said light sensor; and during step d), the user's selection is confirmed as a function of verifying the security code received by the user electronic apparatus during step d) after modifying the count of units of value in the electronic security device;

during step d), a count of votes is incremented corresponding to the selection made by the user during step a), and providing said selection is validated by verification of the security code;

the electronic security device stores information specifying previous elections in which the user of the electronic security device has participated, said information being updated by means of input information during step a), and during step b) or c), normal operation of the electronic security device is inhibited if the input information received for a new vote indicates that the user has already voted in this election;

during step d), the screen is caused to emit a modulated light signal carrying an acknowledgment signal confirming that the user's vote has been taken into account, and the participation information in the memory of the electronic security device is updated only when the light sensor of the electronic security device has received this acknowledgment signal;

the modulated light signals corresponding to different screen areas are modified in random manner after each vote cast by a user;

the different screen areas are juxtaposed on the screen of the user electronic apparatus;

the input information is transmitted between at least two emitting areas belonging to the screen of the user electronic apparatus and at least two light sensors belonging to the electronic security device;

the light signals received by the two light sensors are decoded by calculating a difference between said light signals;

a binary signal is determined by comparing said difference with a threshold value, and then said binary signal is processed by median filtering;

a binary signal is determined by comparing said difference with a threshold value previously determined by causing a predetermined calibration signal to be transmitted between the emitting areas of the screen and the light sensors; and one of the emitting areas of the screen emits a modulated light signal, while the other of said emitting areas emits a constant light signal.

The invention also provides an optical disk for implementing a method as defined above, the disk comprising an annular data area surrounding a central portion carrying no digital data, said optical disk being readable by a user electronic apparatus by means of a light beam reader, which user electronic apparatus further comprises at least one input interface and a light-emitting screen, said data medium including an electronic security device which comprises:

a receive interface having a least one light sensor disposed in the central portion of the optical disk and adapted to receive input information coming from the screen of the user electronic apparatus;

an emit interface adapted to emit output information as a function of received input information, the output information corresponding to a security code for communication to the input interface of the user electronic apparatus; and an electronic central unit connected to the receive and emit interfaces and adapted to determine the output information as a function of the input information and to cause said output information to be emitted by the emit interface;

the safety device can also include a motion sensor.

BRIEF DESCRIPTION OF THE DRAWINGS

Other characteristics and advantages of the invention will appear on reading the following description of embodiments thereof, given as non-limiting examples and described with reference to the accompanying drawings.

In the drawings.

DETAILED DESCRIPTION

In the various figures, the same references are used to designate elements that are identical or similar.

Figure 1:
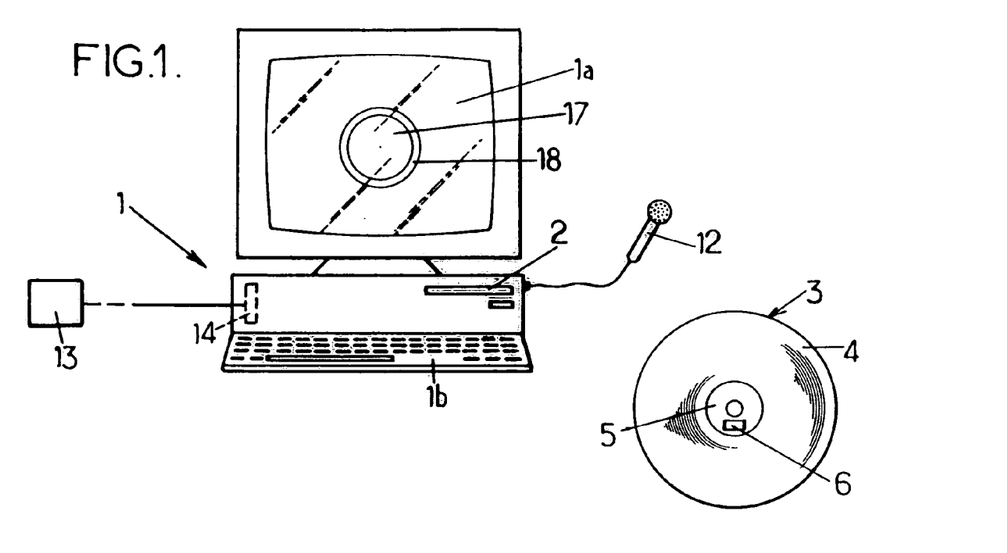
FIG. 1 is a diagrammatic view of a microcomputer capable of using an optical disk constituting an embodiment of the invention, and having an electronic security device.

FIG. 1 shows a microcomputer 1 having a light-emitting screen 1a (cathode ray tube, plasma screen, back-lighted liquid crystal screen, etc.), a keyboard 1b and a reader 2 for reading digital optical disks 3 (CD-ROM, DVD, etc.) or other digital data media.

In a first embodiment, the invention seeks in particular to make the use of the optical disk 3 secure, in particular to prevent illicit copies of the optical disk.

To this end, the optical disk 3 includes an electronic security device 6, said device being located outside the data storage area 4 of the disk, and advantageously in its central portion 5 that does not carry any data.

Figure 2:
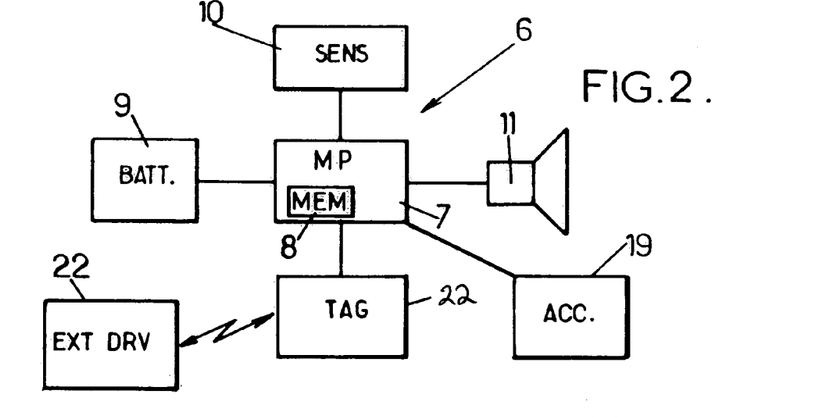
FIG. 2 is a block diagram of the electronic security device of the FIG. 1 optical disk, in a first embodiment of the invention.

This electronic security device is shown in FIG. 2 and it is integrated in the resin matrix of the optical disk. It comprises:

an electronic central unit 7 (MP) such as a microcontroller or a microprocessor associated with memory 8 (MEM) that can be internal to said microcontroller or microprocessor (for example it is possible to use the P8WE5032 microcontroller sold by Philips Semiconductors, a division of Royal Philips Electronics, Eindhoven, The Netherlands, or the AT89SC microcontroller sold by Atmel Corporation, 2325 Orchard Parkway, San Jose, Calif. 95131, USA);

an electricity power supply 9 (BATT.) such as a miniature battery (e.g. a battery sold under the trademark TMF® by Bolder Technologies Corporation, 4403 Table Mountain Drive, Golden, Colorado, Colo., 80403, USA) which powers the electronic device 6;

at least one light sensor 10 (SENS.) such as a phototransistor, a photodiode, or the like; and an acoustic transducer, preferably a piezoelectric transducer, such as a loudspeaker or an electronic buzzer 11 under the control of said central unit 7 and issuing sound signals having a constant frequency spectrum, for example.

The device described above can be used in a security method making it possible, for example, to verify the presence of the original optical disk 3 corresponding to a certain application (program, database, etc.), in particular when initially installing the application on the microcomputer 1.

To this end, when the microcomputer 1 executes the program for installing the application in question, this program generates input information such as a first random code which is transmitted by the microcomputer 1 to the optical disk 3 via the screen 1a in the form of a modulated light signal, e.g. emitted from a predetermined light-emitting area 17 of the screen.

On this occasion, the microcomputer can:

control the reader 2 so as to cause the optical disk 3 to be ejected from said reader; and display a message on the screen requesting the user to place the optical disk 3 with its security device facing the screen and preferably pressed directly against the screen.

In order to encourage proper positioning of the invention disk 3 on the screen, the microcomputer 1 can advantageously display a mark 18 on the screen representing the position of the optical disk. By way of example, this can be a bright circle 18 corresponding to the outside diameter of the optical disk, one or more arrows for bringing into coincidence with arrows or the like marked on the disk, etc. The central hole 3 of the disk can also be put into correspondence with a luminous mark displayed on the screen 1a.

In addition, the face of the optical disk 3 which must be placed facing the screen 1a, and/or where appropriate which must be placed against the screen, can advantageously be identified by one or more predetermined marks placed on the disk 3.

The input information can be encoded by modulating the brightness of the light emitted by the light-emitting area 17 of the screen, and/or by modulating the colors emitted by said area 17.

Advantageously, the light intensity can be modulated using the three primary colors of each pixel of the screen 1a in parallel: this triples the rate at which data can be interchanged between the screen 1a and the optical disk 3. Under such circumstances, the optical disk 10 can have a plurality of sensor elements responsive to respective different primary colors of the pixels of the screen 1a.

The data rate can be further increased by causing the data to be emitted in parallel via a plurality of light-emitting areas of the screen 1a, in which case the device 6 should have a corresponding number of light sensors 10 which are placed in register with the various light-emitting areas.

Given the screen scanning frequencies that are usually encountered, the raw data rate that can be emitted by the screen 1a in this way can possibly be greater than 25 bits per second (bit/s) per primary color, i.e. 75 bit/s using the three primary colors of the pixels.

The modulated light signal can be demodulated in the central unit 7, either by detecting optionally adaptive thresholds, or by detecting fronts, in conventional manner.

By means of this demodulation, the central unit recognizes the input information communicated thereto by the light sensor 10, and determines output information that is a function of the input information: the output information can be presented, for example, in the form of a second pseudo-random code generated as a function of an encoding key contained in the memory 8 of the central unit.

Thereafter, the central unit causes the output information to be issued in the form of a sound signal by the transducer 11.

The sound signal can comprise a plurality of sound signal trains (e.g. three to six trains of sound signals) each comprising a plurality of individual sound signals of constant duration that are close together (being separated from one another by a duration of 0.2 seconds (s) for example). The number of individual sound signals in each sound signal train lies in the range 1 to a predetermined integer n that is not less than 2, and that is equal to 4, for example. The sound signal trains can be separated from one another by periods of silence that are not less than a predetermined duration (for example these periods of silence can all be equal to about 2 s).

The output information is thus encoded by the number of individual sound signals in each sound signal train.

The sound signal containing the output information is listened to by a human operator, which operator thus discovers the second above-mentioned code in the form of a sequence of digits, each lying in the range 1 to n, and corresponding to the respective numbers of sound signals in the various trains of individual sound signals emitted in succession by the disk 3.

Thereafter, the operator communicates a security code that is a function of said second code (and in practice is identical to said second code) to the microcomputer 1, e.g. via the keyboard 1b. These operations are preferably guided by one or more messages displayed on the screen 1a of the microcomputer.

If the received security code is properly related to the first above-mentioned code by a predetermined relationship, then the microcomputer 1 authorizes the installation program to run; otherwise it prevents normal operation of that program.

This controlling of proper running of the installation program can also be obtained, in particular:

by encrypting data contained in the optical disk 3, with the microcomputer being capable of decrypting said data only when given a decrypting key which is a function of the above-mentioned security code and of the above-mentioned first code; or by including in the installation program (or in a program contained in the optical disk 3 for copying into the memory of the microcomputer) a branch to a program address which can be determined only as a function of the above-mentioned security code and of the above-mentioned first code.

The same principles can be used not only for controlling installation alone, but also for use of the computer application in question, constraining the user to use the optical disk 3 at least when launching said application.

Under such circumstances, it should be observed that it is also possible to control the way in which the computer application is used as a function of data included in the memory 8 of the central unit of the optical disk 3, and to provide for the central unit 7 to send the second above-mentioned code only if the required conditions of use are satisfied.

By way of example, it is possible in this way to provide for:

a maximum number of utilizations or a maximum duration of utilization for the computer application;

or a date from which the computer application will no longer operate without purchasing a new optical disk 3;

or a limit on which program modules or data is accessible to the computer (in which case the above-mentioned security process needs to be repeated on each occasion that the user wishes to access a new program module or new data).

It will be observed that the sound signal emitted by the transducer 11 can be coded in ways other than the manner described above, and in particular:

by causing the sound signal to be emitted in the form of a sequence of sound signals of varying durations that are separated from one another by periods of silence that are of predetermined duration, the output information being encoded by the variations in the durations of the various sound signals; or by modulating the frequency of the emitted sound signal (in which case the frequency spectrum of the transducer 11 should not be constant, the transducer possibly taking the form of a piezoelectric loudspeaker).

In a variant, it would also be possible to provide for the sound signal emitted by the transducer 11 to be received directly by the microcomputer 1, in particular via an external microphone 12 which is connected to a sound card inside the microcomputer and which is brought up to the reader 2 by the user at a suitable moment, as a function of instructions given on the screen 1*a* of the microcomputer.

In another variant, the sound signal emitted by the transducer 11 is forwarded to a remote monitoring station 13:

via the above-mentioned microphone 12 and a modem 14 belonging to the microcomputer 1 and connected to the remote monitoring station 13 via the switched telephone network; or by the user telephoning the monitoring station 13.

Under such circumstances, the remote monitoring station 13 determines the security code as a function of said sound signal and forwards the security code to the microcomputer 1 via the modem 14 (or indeed the security code is given by telephone to the user who then types it in via the computer 1*b* of the microcomputer). Optionally, the remote monitoring station 13 can be constrained not to forward the security code to the microcomputer 1, for example if the user of the computer application in question is a subscriber whose subscription has not been paid.

In practice, the remote station 13 can be constituted in particular by an Internet site.

Figure 3:
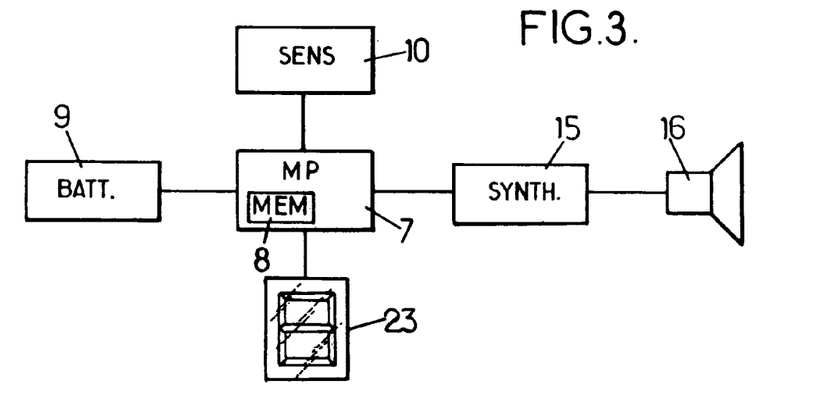
FIG. 3 is a view similar to FIG. 2 showing a second embodiment of the invention.

In another variant, shown in FIG. 3, the sound transducer can be a loudspeaker 16 associated with a voice synthesizer circuit 15, itself controlled by the central unit 7: in which case, the loudspeaker 16 issues a sound message that the user can understand and that contains the output information corresponding to the security code. The voice synthesizer circuit 15 can optionally be integrated in the central unit 7, e.g. being constituted by a microprocessor of the TSP50C0x/1x type sold by Texas Instruments, Dallas, USA.

It should also be observed that the optical disk 3 could include an emission interface other than a sound interface, for example it could include an optical interface.

In particular, the output information could also be communicated to the user via a display 23, as a replacement for or in addition to the transducer 11 or the loudspeaker 16.

Finally, it can be observed that the security process made possible by the optical disk 3 or other data medium of the invention is not limited to controlling the use of programs or data contained in the optical disk: on the contrary, the security process can be used to identify the user, for example, in particular in order to enable remote payment operations or to give remote access to protected data, and this can be done without it being necessary for the microcomputer to be fitted with a specific security device such as a smart card reader, or the like.

Under such circumstances, when the microcomputer 1 age is provided with a microphone 12 and a modem 14, the security process begins by the user entering a secret code via the keyboard 1*b*, and then the above-mentioned central station 13 (or the like) interchanges coded messages with the security device 7 of the optical disk in order to verify correspondence between the code input by the user and a secret key contained in the memory 8 of the central unit 7, as is already known for payment smart cards.

Such remote payment can be used, for example, to access new functions for software stored on the optical disk 3, or to pay for rental of the software carried by the disk 3. In these two cases, the central station 13 (in practice an Internet site) sends an access code to the microcomputer 1, which then requests the user to place the disk 3 with its face to the screen 1*a* so as to be capable of transferring said code to the security device 6 of the disk via the light sensor 10. The code is then used by the device 6 to generate output information in response to the input information, on each new access by the user to said new functions or to the software as a whole.

It would also be possible to use a secure data medium of the kind described above as an electronic purse, or the like. Under such circumstances, the electronic security device 6 could store in memory some number of units of value (monetary units or the like), and the central unit 7 of said security device would then be adapted to cause the sum of units of value to vary as a function of encoded data received and emitted by the central unit 7 via reception and emission interfaces, e.g. for refilling the count when the user purchases units of value, or on the contrary diminishing the count as a function of purchases or other paid-for operations performed by the user, e.g. on the Internet.

When the security device 6 is used for controlling or limiting use of the data medium, as mentioned above, or in order to establish a user profile, the electronic security device can also store one or more counters of utilization units.

When use of the data medium is to be limited, the counter can represent some number of utilizations, for example, and the central unit 7 of said security device can be adapted to increment or decrement said counter as a function of occasions on which the data medium is put into operation, which occasions can correspond to the sensor 10 receiving modulated light signals or to a motion sensor such as a miniature accelerometer 19 (ACC.) detecting when the disk 3 is rotated, where such a sensor can optionally be integrated in the disk 3. For example, the emission interface of the security device can cease to emit coded output information that would normally enable the user apparatus to operate the data medium once the central unit 7 has detected some predetermined number x of occasions on which the data medium has been put into operation, i.e. when the counter counts up to x starting from 0, or when it counts down to 0 starting from x.

By way of example, the sensor 19 can be a microsensor (e.g. presenting an area of 2 millimeters (mm) by 2 mm) obtained by micromachining on silicon, such as the 2 g and 50 g sensors made by le Laboratoire d'Electronique, de Technologie et d'Instrumentation (LETI) of the French Atomic Energy Commissariat (CEA).

When a user profile is to be established, the utilization counter(s) can be incremented, for example, each time the disk 3 receives a modulated light signal from the screen 1*a* in order to access certain software modules, or when the motion sensor 19 detects certain movements, or certain predetermined sequences of movements, representing certain predetermined operations.

Advantageously, the utilization unit counter can be read by an external reader 22 (EXT DRV—FIG. 2) by means of a communications interface 21 such as an electronic tag (TAG) suitable for communicating with the reader 22 by radio and belonging to said security device 6. Such a utilization counter can be read, for example, when the user goes to a retail outlet dealing in the data medium. Under such circumstances, the data medium can advantageously be miniaturized, for example it can be in credit card format.

When the security device 6 has a motion sensor 19, the central unit 7 can, where appropriate, be designed to prevent the device 6 from operating when the motion sensor 19 detects certain movements or certain sequences of movements, for example continuous rotary movement for a length of time in excess of a predetermined limit. In which case, it can be possible to unlock operation of the security device 6 by making a connection to a remote central station 13, e.g. an Internet site, and by using said remote central station to generate a coded signal that is emitted by the screen 1a of the computer in the form of a modulated light signal which is received by the light sensor 10.

In the embodiment of FIGS. 4 to 7, the electronic security device 6 is not integrated in a CD-ROM, but in a portable appliance 30 such as a badge, e.g. having substantially the same format as a credit card in terms of width and length. The security device can operate in one or other of the implementations described above with reference to FIGS. 1 to 3.

Figure 4:
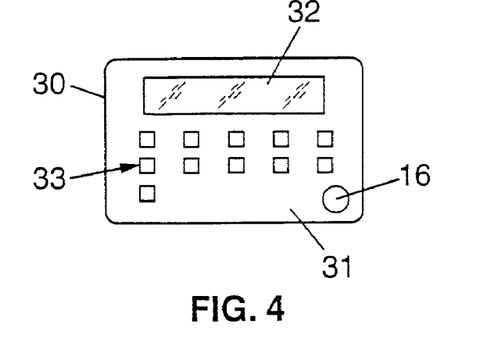
FIG. 4 shows an electronic security appliance device in another embodiment of the invention, seen in front view.
Figure 5:
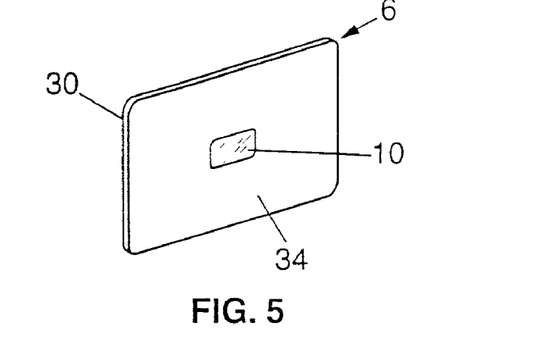
FIG. 5 is a perspective view showing the rear face of the FIG. 4 electronic security appliance.

As shown in FIGS. 4 and 5, the electronic appliance can include, for example on its front face 31, a screen 32 and a keypad 33, and also a loudspeaker 16. Where appropriate, it should be observed that either the screen 32 or the loudspeaker 16 could be omitted.

Furthermore, the rear face 34 of the appliance 30 has at least one light sensor 10 similar to that described above in the embodiments of FIGS. 1 to 3.

Figure 6:
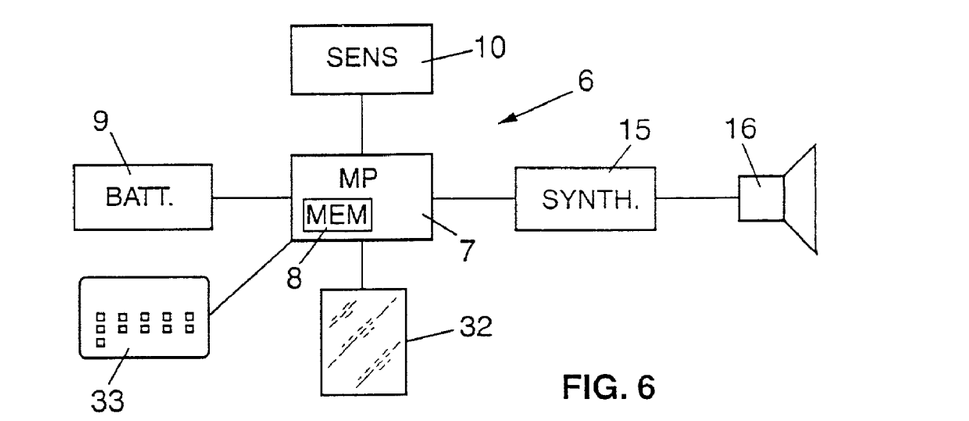
FIG. 6 is a block diagram of the FIG. 4 device.

As shown in FIG. 6, the electronic security device 6 comprises a central unit 7 identical or similar to that described above and associated with a memory 8, the unit being connected to the screen 32, to the keypad 33, to the sensor 10, to a battery 9, and to a loudspeaker 16, where appropriate via a voice synthesizer circuit 15.

It will be observed that the screen 32 can be no more than a display giving a readout of a few digits only, in particular a liquid crystal display, and that the sensor 10 is advantageously associated with analog electronics including, in particular, an integrator enabling it to be independent of the horizontal scanning of a screen when the screen is a cathode ray tube, and a comparator for overcoming variations in light flux coming from different screens or depending on the settings of a screen and/or depending on ambient lighting.

Figure 7:
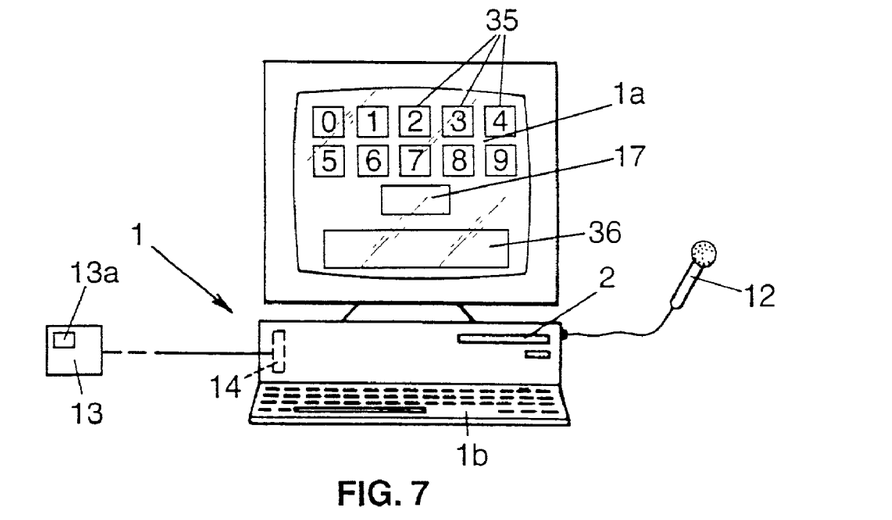
FIG. 7 is a diagrammatic view of a microcomputer capable of co-operating with the electronic security appliance of FIGS. 4 to 6.

As shown in FIG. 7, the electronic security device 6 can be used as in the above-described examples to sense a modulated light signal emitted by a area 17 of the screen 1a of the microcomputer 1, to receive input information coming from said microcomputer.

Furthermore, the screen of the microcomputer can also include a plurality of predetermined screen areas 35 emitting respective light signals that are different from one another, e.g. corresponding to different symbols that can be displayed in the clear in each area 35 or beside each area 35. In the example shown in FIG. 7, the symbols associated with the various areas of the screen are constituted by ten digits going from 0 to 9.

The screen areas 35 thus constitute a kind of optical keypad enabling a user to communicate information to the central unit 7 of the electronic security device, as explained below.

It should be observed that when the microcomputer 1 is provided with such an optical keypad, the keypad 33 could be highly simplified, and could be constituted by no more than an ENTER button associated, where appropriate, with an on/off button, for example.

The operation of the device described above is similar to the operation of the device described previously with reference to FIGS. 1 to 3.

More precisely, when the microcomputer 1 executes the program requiring the identity of a user to be established, for example, said microcomputer can display a message in an area 36 of the screen 1a asking the user to place the light sensor 10 of the appliance 30 so that it faces the area 17 of the screen 1a in order to receive input information. For this purpose, the user activates the appliance 30 by means of an on/off button that forms part of the keypad 33, or it can be activated automatically merely by presenting the light sensor 10 to the area 17 of the screen which emits a modulated light signal that can be recognized by the central unit 7 of the electronic security device 6.

In order to gain access to certain "sensitive" functions of the appliance 30, e.g. in order to perform on-line payment over the Internet, etc., the user may optionally need to input an access code to the central unit 7.

There are several ways in which this access code can be communicated:

when the appliance 30 is provided with a sufficiently complex keypad 33, the access code can be keyed-in by the user via the keypad 33;

the access code can be input by the user typing on the keyboard 1b of the microcomputer 1, after which the microcomputer 1 emits a modulated light signal carrying said access code via the screen area 17 or some other predetermined screen area: the user then places the light sensor 10 of the appliance 30 to face the screen area 17 so that the access code is conveyed to the central unit 7 via said light sensor; or when the screen 1a of the microcomputer 1 displays the above-mentioned screen areas 35, the user can place the light sensor 10 successively in register with different areas 35 corresponding to the digits or other symbols making up the access code (the user enters each symbol of the access code by pressing on the enter button of the keypad 33 when the light sensor 10 is situated facing the screen area 33 corresponding to the symbol which the user wishes to send to the central unit 7).

After the electronic security device 6 has been activated, the user follows messages displayed in the area 36 of the screen to position the light sensor 10 facing screen area 17, so that the central unit 7 of the electronic security device receives input data coming from the microcomputer 1.

Reception of this input data can be triggered by the user pressing on an enter button belonging to the keypad 33, as explained above.

Furthermore, when data has been properly received by the central unit 7, said central unit can cause the loudspeaker 7 to issue a predetermined signal (naturally such acknowledge sound signals can be also emitted when using the "optical keypad" constituted by the areas 35 of the screen 1a when entering an access or other code into the central unit 7).

It will be observed that when data is communicated to the portable appliance 30 by a modulated light signal emitted by the screen area 17, the modulation of the light signal can be implemented as follows:

every message emitted by the screen area begins with a predetermined header enabling the central unit 17 to calibrate the receive light signal and to synchronize itself with the received light signal; and then the message data is conveyed in the form of a series of bits emitted during successive time windows, e.g. having a duration of 30 milliseconds (ms) each, with a 0 bit being represented, for example, by a high level light signal (i.e. light is emitted) during the first 200 ms of the corresponding window followed by a low level light signal (i.e. no light is emitted) during the last 100 ms of the corresponding window, while a 1 bit is represented, for example, by a low level light signal being emitted during the first 100 ms of the corresponding window followed by a high level light signal during the last 200 ms of the corresponding window.

Once the input data has been received by the central unit 7, it calculates a security code which is a function of said input data and of other data.

By way of example, the security code can be a function both of the input data received optically, and of an internal code stored in the central unit 7, optionally together with one or more additional parameters such as the time, the date, a user identifier, an identifier of the microcomputer 1, etc.

Where appropriate, the security code calculated by the central unit 7 can also be a function of a personal code of the user, which said user needs to communicate to the central unit 7, e.g. by one of the three means described above concerning the access code. Under such circumstances, the security process makes it possible not only to verify the presence of the electronic security device 6, but also the identity of the user or to authenticate the user, which is extremely important, particularly for operations involving electronic payment.

As an example of monetary or non-monetary operations that can be performed using the device of the invention, it is possible in particular to provide in the memory 8 of the central unit 7 a count of units of value (monetary or otherwise) that can be reloaded from a bank or other organization, and on the basis of which it is possible to transfer units of value to the outside world, in particular to make payments electronically.

In order to reload units of value into the count in the memory 8, the user's microcomputer 1 can be connected to the computer system 13 of a bank or other organization, e.g. via the Internet, etc.

Once the connection has been established, the user of the microcomputer 1 optionally actuates certain monetary functions of the appliance 30, as mentioned above, and also supplies his or her or own identity as described above by receiving input information via the area 17 of the screen 1a which is transmitted to the appliance 30 by means of the light sensor 10, and by inputting a personal code into the central unit 7, likewise as described above, after which the central unit defines a security code which it communicates to the user via the screen 32 and/or the loudspeaker 16. The user then enters this security code into the keyboard 1b of the microcomputer 1, so that the microcomputer 1 and/or the remote computer system 13 can verify the user's identity.

Furthermore, the remote computer system 13 also verifies that the credit requested by the user can be transferred, e.g. in the light of the balance in an account 13a of the user held by the computer system 13 or known to said computer system.

If this transfer of units of value is possible, it is then triggered by the remote computer system, preferably in encrypted form.

The number of units of value contained in the memory 8 of the central unit 7 is then increased by the amount of the transfer, and the central unit 7 then preferably sends an acknowledgment signal in the form of a code which is displayed on the screen 32 and/or issued by the loudspeaker 16.

This code is then keyed in by the user via the keyboard 1b of the microcomputer 1 so as to be communicated to the remote computer system 13, which can thus verify that the credit transfer has taken place appropriately.

In a variant, the code corresponding to the acknowledgment signal can also be transmitted to a trusted third party by the microcomputer 1.

To transfer units of value to an external entity, i.e. to spend units of value, it is optionally possible to use the same procedure as that described above, except that instead of receiving units of value from the remote computer system 13, the central unit 7 receives a claim, i.e. a request for units of value that will give rise to a corresponding decrease in the quantity of units of value in the central unit 7, and the acknowledgment code then indicates that payment has been accepted by the user of the electronic security device 6.

Finally, the device of FIGS. 4 to 7 can also be used in an electronic voting procedure, i.e. in a procedure for making a choice amongst a plurality of possibilities while guaranteeing simultaneously that voting is secret and that voting is not fraudulent (in particular that any given user has been able to vote only once).

This vote can be cast, for example, by causing screen areas 35 to be displayed simultaneously or in succession that correspond to the various candidate choices. Each screen area 35 is preferably associated with a symbol and/or with explanations displayed on the screen in correspondence with said screen area.

The voting procedure can take place as follows, for example:

after the portable appliance 30 has been activated, the user places the light sensor 10 of the appliance to face the screen area 35 corresponding to the selection which the user wishes to make, and the selection is enabled by means of the enter button of the keypad 33, the user also communicating a personal code to the central unit 7 by one of the means mentioned above (if the user's personal code is to be entered by means of an "optical keypad", some of the areas 35 displayed on the screen will then correspond to the optical keypad, while other screen areas 35 correspond to various vote options available to the user);

the central unit 7 then issues a security code by means of the screen 32 and/or the loudspeaker 16, which code indicates the selection made by the user without revealing the identity of said user;

the user enters the security code via the keyboard 1b so that the microcomputer can confirm the user's selection after verifying that the security code is associated by a predetermined relationship with input information received from the selected screen area 35;

the microcomputer 1 then preferably issues an acknowledgment signal via the screen area 17 and displays a message in the screen area 36 indicating that the user is to place the light sensor 10 facing the area 17;

the user places the light sensor 10 facing the screen area 17 so that the central unit 7 receives the acknowledgment signal indicating that the user's vote has indeed been taken into account;

the microcomputer 1 and/or the remote computer system 13 connected to said microcomputer 1 increments a vote counter corresponding to the selection made by the user; and the central unit 7 stores information indicating that the user has just voted (the election in which the user has just participated can be identified, for example, by means of information contained in the input information initially received by the central unit 7).

If the user seeks to vote a second time in the same election, the central unit 7 is advantageously designed to prevent the vote taking place normally as soon as the election had been identified, with election identity being received initially in the input data coming from the selected screen area 35 corresponding to an election it already has in memory, and in which the user of the electronic security device 6 has already participated.

Preferably, in order to further guarantee that the vote is secret, e.g. by preventing a third party from discovering the votes cast by the user from the portable appliance 30, provision is advantageously made for the central unit 7 of said appliance to keep no record of the selections made when casting votes. Furthermore, it is also advantageous to make provision for only the microcomputer 1 to be able to determine the relationship between the input information received coming from the screen area 35 as selected by the user and a given vote: for this purpose, provision can be made, for example, for the microcomputer 1 randomly to modify the respective modulated light signals emitted by the various screen areas 35 corresponding to the various candidates available to the user, and to do so in particular after each vote by a user.

It should be observed that the electronic user apparatus could be a payment terminal, a terminal for dispensing real or electronic cash, a terminal controlling access, etc.

Figures 8, 9, 10, 11, 12:
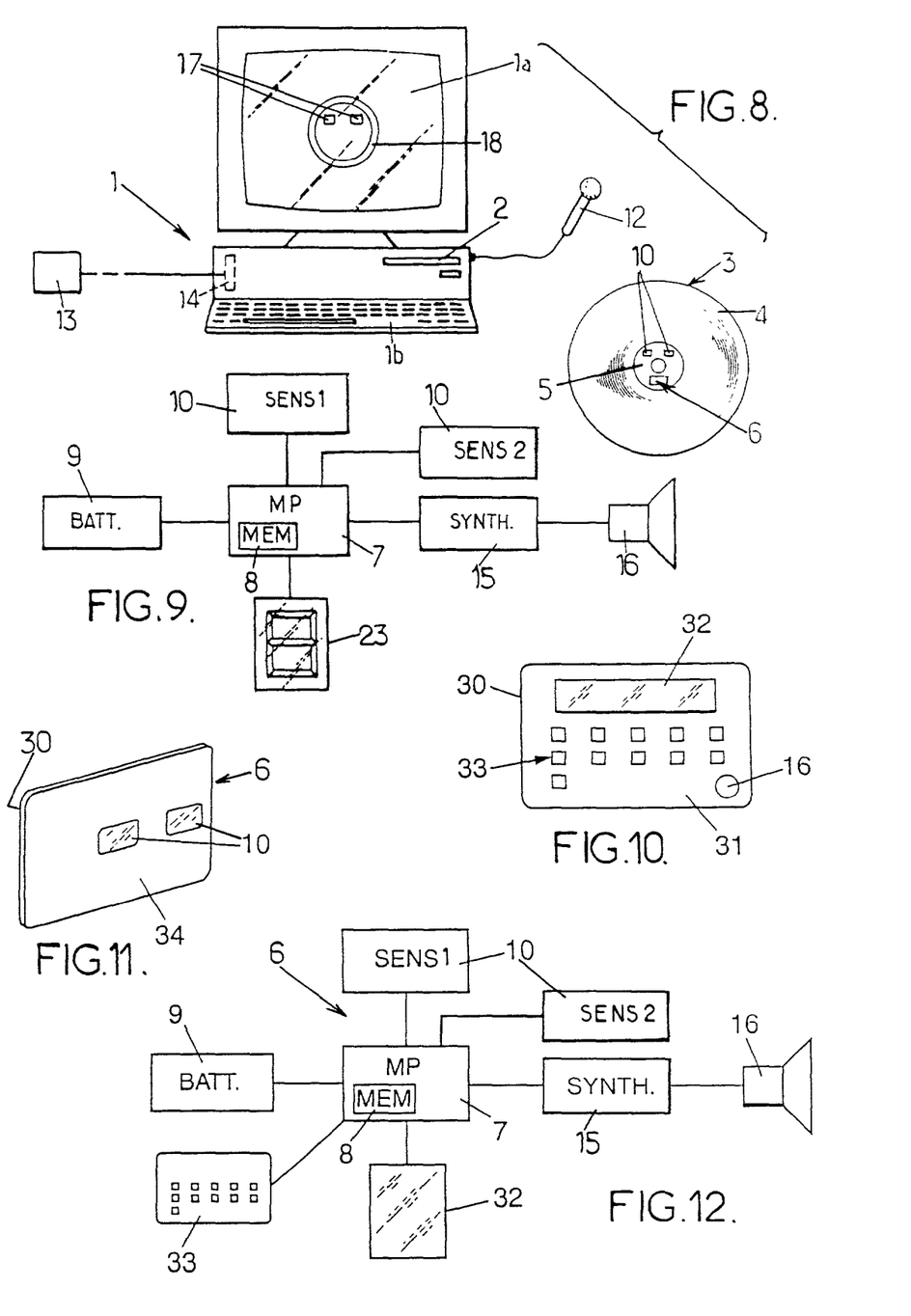
FIGS. 8 and 9 are views similar to FIGS. 1 and 3 for a variant of the invention.
FIGS. 10 to 12 are views similar respectively to FIGS. 4 to 6 showing another variant of the invention.

Furthermore, FIGS. 8 and 9 show a variant of the invention, similar to the embodiments of FIGS. 1 and 3, but differing therefrom by the fact that the optical disk 3 has two light sensors 10 (SENS1, SENS2) instead of only one.

Furthermore, when it is desired to transmit information from the microcomputer 1 to the security device 6 of the optical disk, two light-emitting areas 17 of the screen 1a are used.

The user must then place both light sensors of the disk 3 so that they correspond respectively with both light-emitting areas 17 so that each sensor 10 receives a light signal Sa, Sb coming from the corresponding area 17. Advantageously the screen 1a and the optical disk 3 can have marks ensuring that the disk 3 is properly oriented so that each of its light sensors 10 faces the corresponding area 17 of the screen.

The signals Sa, Sb are generated by the sensors 10, e.g. in the form of current signals, in which case they are preferably transformed into voltage signals in a current-to-voltage converter prior to being conveyed to the central unit 7 of the device 6. The central unit 7 then calculates the difference Sa-Sb between the signals Sa and Sb (in relative value or in absolute value) in order to determine a signal received from the screen 1a, thus canceling out the influence of ambient lighting.

Advantageously, one of the light-emitting areas 17, referred to as a first area, can flash while transmitting the desired information (for example a bit equal to 1 can be represented by a period during which said area 17 is white while a bit equal to 0 can be represented by a period during which said area 17 is black), while the other or "second" light-emitting area 17 remains unchanging (e.g. black). The second light-emitting area 17 can either be a limited area of the screen 1a, as shown in FIG. 8, or else it can occupy the major fraction of the screen 1a outside the first area 17. The successive periods during which the first area 17 is black or white are preferably all of the same duration or of durations that vary but in repetitive manner, and the reading of the areas 17 by the light sensors 10 is synchronized with the periods.

Advantageously, the signal Sa-Sb is initially filtered to cancel out the effects of screen scanning when the screen is a cathode ray tube, after which the central unit 7 compares the difference Sa-Sb as filtered in this way with a threshold value in order to determine whether it is receiving a 0 bit or a 1 bit, after which the signal S processed by the central unit 7 becomes binary. The threshold value can be predefined, or it can be adaptive and determined, for example, during a calibration stage in which the microcomputer 1 causes the areas 17 to emit a signal that is known in advance to the central unit 7.

During this calibration stage, e.g. performed at the beginning of each communication between the screen 1a and the security device 6, it is possible in particular to cause the first area 17 to send a header signal (possibly repeated several times) during which the first area 17 emits a high signal (white) for 0.5 s, and then a low signal (black) for 0.6 s, while the second area 17 remains black, for example. The threshold value can then be determined by averaging the values Sa-Sb as measured during these various periods, and selecting the same number of values Sa-Sb which correspond to a high signal as values Sa-Sb which correspond to a low signal, for example.

Advantageously, the binary signal S can be processed by median filtering so as to escape from impulse noise which is very common.

The filtered signal SM is obtained by calculating the median value of the signal S over 2N+1 successive samples, thus establishing a sliding window of 2N+1 samples centered on the sample k of the signal that needs to be determined:

$$SM(k)=\text{median}[S(k-N), S(k-N+1), \ldots, S(k), \ldots, S(k+N-1), S(k+N)]$$

which amounts to taking a majority vote among the 2N+1 samples of S.

The sampling period is selected to be much shorter than the duration of periods during which the first area 17 retains constant brightness. By selecting N so that the duration which corresponds to N successive samples is considerably shorter than the duration for which the first area 17 is at constant brightness, proper decoding of the received light signal is not disturbed but any noise that affects less than N samples is corrected.

The two areas 17 could optionally both emit modulated light signals, e.g. in phase opposition between one area 17 and the other. Under such circumstances, it is the sign of the difference Sa-Sb which determines the value of each bit transmitted. Under such circumstances, the above-described signal processing can be applied, mutatis mutandis.

Furthermore, as already mentioned above for other embodiments of the invention, it is possible optionally to multiply the data rate from the screen to the security device 6 by a factor of three by transmitting different signals respectively in each of the three primary colors used by the screen providing it is a color screen. Under such circumstances, each light sensor 10 has three individual detectors corresponding to said three primary colors respectively.

Finally, as shown in FIGS. 10 to 12, a portable appliance 30 of the kind shown in FIGS. 4 to 6 can likewise be fitted with two light sensors 10 for reading two light-emitting areas 17 of the screen 1a of a microcomputer 1 or of some other electronic apparatus. The way in which data is transmitted from the screen 1a to the sensors 10 of the appliance 30, and the way in which the signal is transmitted within the appliance 30 can be identical or similar to that described above for FIGS. 8 and 9.

The invention claimed is:

1. A security system integrated with an optical disk, comprising:

a microprocessor;

a light sensor coupled to the microprocessor;

a sound emitter coupled to the microprocessor;

a power source providing power for operation; and executable code in digital memory accessible to the microprocessor;

the microprocessor, the light sensor, the sound emitter, the digital memory with executable code, and the power source comprising an electronic security device embedded in a region of the optical disk where data is not store; and a computer having a drive enabled to read the optical disk, a keyboard and a display;

wherein the light sensor receives a code modulated in light, the microprocessor, running the executable code, uses the received code to retrieve an associated code from the digital memory, and transmits the associated code by the sound emitter modulated in sound waves understandable by a human operator, who inputs the code to the computer through the keyboard.

2. The security system of claim 1 wherein the associated code is provided to the computer through a microphone coupled to the computer, the microphone a part of the input apparatus.

3. The security system of claim 1 wherein the associated code transmitted to the computer is used by the computer to authorize or not authorize one or more actions associated with the optical disk.

4. The security system of claim 3 wherein the disk comprises executable code for installing one or more programs on the computer, and the actions authorized comprise installing or not installing the one or more programs on the computer.

5. The security system of claim 1 wherein the computer provides specific instructions for positioning the optical disk relative to the display screen for transmission and reception of the code from the computer to the light sensor.

6. The security system of claim 5 wherein a security process is triggered initially by a user attempting to open the optical disk in a drive on the computer, the process including the specific instructions, which also prompt the user to remove the disk from the drive and place it in a specific position relative to the display screen.

7. The security system of claim 1 further comprising a remote security device which receives the sound signal, associates the sound signal with a security code, and provides the security code to the computer.

8. A method for providing security for an optical disk, comprising:

(a) embedding an electronic security device comprising a microprocessor, a light sensor coupled to the microprocessor, a sound emitter coupled to the microprocessor, a power source providing power for operation, and executable code in digital memory accessible to the microprocessor in a region of the optical disk where data is not stored;

(b) providing a code modulated in light from a display screen of a computer having a keyboard;

(c) receiving the code by the light sensor of the embedded security device;

(d) associating the retrieved code by the microprocessor with a stored associated code; and (e) emitting the associated code by the sound emitter as audio understandable by a human operator, who inputs the code to the computer through the keyboard.

9. The method of claim 8 wherein the associated code is provided to the computer through a microphone input.

10. The method of claim 8 wherein the associated code transmitted to the computer is used by the computer to authorize or not authorize one or more actions associated with the optical disk.

11. The method of claim 10 wherein the disk comprises executable code for installing one or more programs on the computer, and the actions authorized comprise installing or not installing the one or more programs on the computer.

12. The method of claim 8 wherein the computer provides specific instructions for positioning the optical disk relative to the display screen for transmission and reception of the code from the computer to the light sensor.

13. The method of claim 12 wherein a security process is triggered initially by a user attempting to open the optical disk in a drive on the computer, the process including the specific instructions, which also prompt the user to remove the disk from the drive and place it in a specific position relative to the display screen.

14. The method of claim 8 further comprising a remote security device which receives the sound signal, associates the sound signal with a security code, and provides the security code to the computer.

* * * * *